2,873,258

POLYMERIZATION PROCESS FOR OLEFIN OXIDES

Alexej Bohumil Borkovec, Lake Jackson, Tex., assignor to The Dow Chemical Company, Midland, Mich., a corporation of Delaware No Drawing. Application June 6, 1957
Serial No. 663,879

8 Claims. (Cl. 260—2)

The present invention has reference to, and has as among its principal objects, the provision of a novel and greatly improved process for the polymerization of olefin oxides, particularly propylene oxide, to solid polymeric materials under the catalytic influence of certain partially hydrolyzed ferric compounds that are adapted to secure unusually complete conversions of monomer to polymer and especially good yields of desirable solid polymeric products.

According to the invention, various olefin oxides, particularly propylene oxide may be polymerized with practically complete or almost complete conversion of monomer, to provide relatively high yields of solid polymeric materials by employing as a catalyst for the polymerization a partially hydrolyzed ferric compound that has been derived by incomplete hydrolysis of a ferric compound which is a reaction product of a ferric halide and propylene oxide corresponding to the empirical formula $FeX_3 \cdot (C_2H_6O)_n$, wherein X is a halogen of atomic number from 17 to 35 and $n$ has a value from 2.0 to 6.

The catalytic activity of the partially hydrolyzed ferric halide-propylene oxide reaction products is amazingly good. Ordinarily, it may be found to vary with the degree of hydrolysis that is obtained in the partially hydrolyzed catalyst. Thus, the yield of solid polymer that may be obtained in the polymerization with the partially hydrolyzed catalyst increases with the degree of hydrolysis so as to reach a maximum at about a level of hydrolysis at which the amount of water which is involved in the hydrolysis is about 1½ moles for each mole of iron in the reaction product. After this, when greater levels of hydrolysis are attained, the yield of solid polymer that may be obtained is found to decrease very slowly in proportion to an increasing degree of hydrolysis. The conversion of monomer to polymer is also proportional to the degree of hydrolysis of the catalyst. It decreases quite slowly until a level of hydrolysis is reached where about two moles of water are employed for each mole of iron in the reaction product. After this point, the decrease in the conversion rate is more rapid in proportion to the level of hydrolysis in the catalyst.

The polymeric materials that may be obtained by practice of the process of the present invention are solid substances that have at least one and usually more of a variety of uses including the preparation of moldings, films, fibers and filamentous articles and in coating compositions for various protective surface covering applications. They generally provide tenacious and high strength fabricated articles that have inherently good dielectric properties. Propylene oxide, for example, may generally be completely or substantially completely converted by the present method to a white, solid, crystalline polymeric material that may have an average molecular weight in excess of 100,000, a melting point that may be greater than 50° C. and frequently greater than 70° C., and a specific gravity in the neighborhood of 1.03–1.05. The homopolymers of propylene oxide which may be obtained are essentially similar to those which have been described in United States Letters Patent Number 2,706,189.

The partially hydrolyzed ferric halide propylene oxide reaction products that are employed as catalytic compounds with such great advantage in the practice of the present invention may be derived easily from the corresponding parent compounds of propylene oxide with anhydrous ferric chloride or ferric bromide. In general, the parent condensates are essentially similar to those which are set forth and described in United States Letters Patent No. 2,706,181. This incomplete hydrolysis of the parent condensates may be accomplished at moderate temperatures of say 10 to 80° C. by adding an adequate quantity of water to obtain the desired degree of partial hydrolysis of the parent condensate while it is dissolved in a suitable anhydrous solvent such as carbon tetrachloride and the like. The preparation of the partially hydrolyzed catalyst should be at temperatures that are less than about 80° C. since the catalyst decomposes when it is subjected to heat at more elevated temperatures. The reaction may be carried out at atmospheric pressure and within the period of time that is required for complete addition of the water, preferably in dropwise increments and in solution with another solvent. The catalytic, partially hydrolyzed products of propylene oxide with anhydrous ferric chloride or ferric bromide are usually isolated as solids for subsequent employment in the polymerization. They are usually noncrystalline in nature and have a yellow to brown shade of coloration. They have high surface area characteristics and are insoluble in the common organic solvents. The partially hydrolyzed catalysts react with water to form complex ferric oxides and are thermally decomposable above the indicated temperature levels.

The parent compounds from which the partially hydrolyzed catalyst compounds of the present invention are derived may be prepared in essentially the same manner as is set forth in the referred-to United States Patent No. 2,760,181. The parent compounds correspond approximately to the empirical formula $FeX_3 \cdot (C_3H_6O)_n$, wherein X is a halogen of the indicated type and $n$ has the indicated value.

The reaction between a ferric halide and propylene oxide is quite complex. It appears to proceed in a series of distinct steps. The first molecule of propylene oxide that becomes involved in the reaction reacts with the ferric halide to yield a haloalkoxy ferric dihalide according to the following equation:

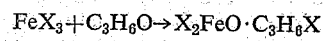
$$FeX_3 + C_3H_6O \rightarrow X_2FeO \cdot C_3H_6X$$

The second molecule of propylene oxide reacts with the haloalkoxy ferric dihalide in a similar fashion to yield a di-(haloalkoxy) ferric halide in the following manner:

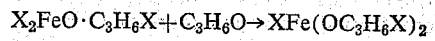
$$X_2FeO \cdot C_3H_6X + C_3H_6O \rightarrow XFe(OC_3H_6X)_2$$

The reactivity of the iron-halogen bond is greatly influenced by such substitutions, although in the first of the above indicated steps, the remaining two iron-halogen bonds are still quite reactive. The replacement of the second halogen with the alkoxy group causes the third halogen to become quite unreactive. Thus, the third molecule of propylene oxide, instead of reacting with the remaining Fe—X, reacts with one of the haloalkoxy groups, that is with the Fe—O group, as indicated in the following equation:

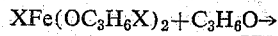
$$XFe(OC_3H_6X)_2 + C_3H_6O \rightarrow XFe(OC_3H_6 \cdot OC_3H_6X)(OC_3H_6X)$$

Additional molecules of propylene oxide react in a similar fashion by extending the alkoxy chains of the molecule. As a general rule, it requires quite vigorous conditions, such as the employment of large excesses of propylene oxide, extended reflux periods and elevated temperature and pressure conditions, to replace the remaining halogen atom in the reaction product.

The reactivity of the iron compound towards propylene oxide may be observed to decrease quite rapidly from step to step during the synthesis. When free ferric halide is present, the reaction is quite difficult to control. Unless highly dilute solutions are used, a complex mixture of reaction products that are substituted to various degrees is obtained, even in the very first of the above indicated steps. A mixture of two isomers will generally result even in the cases where the substitution is limited to only one of the iron halogen groups. The epoxy or oxirane ring of the propylene oxide can be, and frequently is, opened in two ways to yield derivatives of either 1- or 2-propanol. If more than 1 mole of propylene oxide is reacted with a mole of ferric halide, a complex mixture of isomers and homologs is obtained. According to ebullioscopic measurements, the ferric haloalkoxy halides are essentially unassociated in a solution.

The partial hydrolysis of the reaction product complicates its composition to a still greater extent. The general structure of the ferric halide-propylene oxide reaction product can be illustrated in the following way:

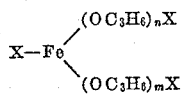

wherein the sum of $n$ and $m$, which are positive integers, is indicative of the number of moles of propylene oxide that are present in the reaction product for each mole of iron therein. The existence of such structure is supported by the evidence of experiments wherein the alkoxy chains are hydrolyzed and the resulting hydroxy compounds identified and also upon elemental analysis.

Partial hydrolysis of the ferric halide propylene oxide reaction product yields an amorphous, insoluble material which appears to be polymeric in nature. Also, the corresponding hydroxy compounds can be identified as products of the hydrolysis. The partially hydrolyzed iron compound apparently contains only relatively few free hydroxy groups, as is evidenced by the lack of absorption bands upon infrared analysis in the 2.75 to 3.75$\mu$ region, as might otherwise be expected if free hydroxyl groups were present in the material. It appears that the oxygen atoms of the hydroxy groups form a coordinate covalence or similar type of bond with a neighboring iron atom. In this manner, two or three dimensional polymeric networks are obtained in the partially hydrolyzed reaction products.

The amount of the partially hydrolyzed catalyst that is employed may ordinarily, with advantage, be an amount that is between about 1 and 6 percent by weight, based on the weight of the oxide monomer being polymerized. Preferably, an amount of the catalyst in the neighborhood of 2–4 percent by weight is utilized. The employment of the latter amount of catalyst for accomplishing the polymerization ordinarily secures optimum rates of reaction and more complete conversions of the monomer to polymer. In this connection, it is oftentimes possible in the practice of the present invention to secure complete conversion of monomer to polymer with yields of solid, more useful polymeric material that frequently are as high as 60 to 80 and more percent of the converted monomeric substances. The exact yields of solid polymer that may be obtained in particular instances may vary somewhat from time to time according to the method of recovery and polymer purification that is followed. At any rate, the use of the partially hydrolyzed ferric compounds as catalysts in the process of the present invention generally secures better results and more desirable product yields than may be obtained with employment of the catalyst materials heretofore known in the art for the same polymerization purposes.

The polymerization may usually be conducted within a time period of from 3 to 200 hours at a temperature between about 40° C. and about 100° C. Advantageously, the polymerization may be effected at a temperature in the range from about 85° C. to 95° C. in order to avoid the prolonged periods of time that may be required to reach a suitable point for termination of the reaction when lower temperatures are employed and to insure the achievement of relatively greater conversions that sometimes may be difficult to realize at higher operating temperatures. Within the narrower range, suitable results may frequently be obtained when the polymerization has been conducted for a period of time between about 40 and 180 hours. The greatest advantage is usually derived with respect to both the conversion efficiency and product quality when the temperature for the polymerization is maintained in the neighborhood of 80° C.

It ordinarily may be convenient and frequently may be found more expedient for the polymerization to be accomplished by charging the reactant ingredients, including the catalyst, to a closed vessel wherein they may be heated until the polymerization has been completed or terminated. It is usually beneficial for the reaction mass to be agitated during the polymerization. Care should be taken to avoid the presence of water or alcohol in the polymerization mass since they frequently may exert a deleterious influence on the rate of the reaction and the monomer conversion that may be obtained.

The polymerization reaction will also proceed when the monomeric oxide and the partially hydrolyzed catalyst are dissolved in a suitable inert non-aqueous diluent medium. The employment of such a medium for the polymerization may sometimes tend to reduce the rate of the reaction. Polar solvents, such as ethers, ketones, ketals, and the like seem to reduce the yield of solid polymer that may be obtained. Non polar solvents, such as petroleum ether, hexane, hydrocarbon solvents and the like do not seem to appreciably affect the yield. In most cases, if it is desired to employ a solvent medium, it is most advantageous to utilize a large excess quantity of the monomer that is being polymerized for such purpose.

The polymerized product may be recovered and purified from the reaction mass according to several procedures. For example, excess monomer and the solvent or other diluent medium (when one has been employed) may be stripped from the reaction mass by vaporization to leave the catalyst-containing polymeric material which usually is in the form of a tough, rubber-like mass having a brownish coloration and which may be associated with liquid polymers that may have been formed during the reaction. Usually the impure solid polymer may be dissolved in a suitable solvent, such as hot acetone, which may then be acidified with a hydrohalic or other suitable acid to convert the iron-containing, partially hydrolyzed catalyst to a soluble salt form before precipitating the solid polymer by crystallization from the solution at a suitably low temperature that generally is beneath about −20° C. Recrystallization may be employed for further purification until a suitable solid polymeric material is obtained that has a sufficiently high molecular weight to not soften excepting at temperatures that are in excess of about 50° C.

Alternatively, the polymer may be dispersed in a hot solvent such as acetone, dioxane, and the like. After this, an acid (such as hydrochloric or sulfuric acid) may be added to convert the iron into soluble salts. After conversion of the iron, an excess of water may be added to dissolve the ferric salts. Some of the non-solid polymer generally remains in fine dispersion in the water. The solid polymer product flocculates, upon addition of the water. After its physical recovery it may be dried in vacuum.

Another method for recovering and purifying the polymer is to comminute the polymerization product and then to macerate it with a dilute solution of HCl, say about 1 percent or less by weight, in acetone, dioxane or the like solvent at a temperature which is preferably maintained beneath 25° C. After the color of the polymer is observed to have changed from brown to yellowish white (usually requiring 20 to 60 hours) the solvent is decanted and the purified polymer macerated in cold or hot water to extract the remaining iron salt. The purified polymer product may then be dried in a vacuum. A similar purification procedure involves treating the comminuted crude polymer product with a dilute aqueous solution (1 percent or less) of hydrogen chloride until the color of the polymer becomes completely white. This usually requires from 20 to 100 hours. After this period, the liquid may be decanted from the purified polymer; replaced by fresh water, to remove all trace of the iron salts; after which the polymer may be dried in vacuum. Still another method of purifying the polymer is to extract the comminuted crude product with cold acetone to provide a material which can be directly molded or extracted. This technique, however, leaves a brown color in the polymer product.

As indicated, the method of the invention is adapted to prepare polymers of other olefin oxides besides propylene oxide. Solid polymers of such lower olefin oxides as ethylene oxide, chloropropylene oxide, which is also known as epichlorohydrin, isobutylene oxide and others that contain not more than four carbon atoms in their molecules may also be obtained. In addition, copolymers of propylene oxide and other lower olefin oxides with other organic epoxides that may be used in amounts comprising up to about equal proportions by weight of the latter with the propylene oxide may also be prepared by practice of the invention. Thus, copolymers of propylene oxide with another olefin oxide selected from the group consisting of ethylene oxide, chloropropylene oxide, isobutylene oxide, 1,2-epoxybutane, the isomeric 2,3-epoxybutanes, styrene oxide and mixtures thereof may readily be obtained.

The invention is further illustrated in and by the following examples.

EXAMPLE 1

A suspension of 41 g. (0.25 mole) of anhydrous ferric chloride in 500 ml. of dry carbon tetrachloride was vigorously stirred in a two liter three-necked flask furnished with a reflux condenser and a dropping funnel. A dry nitrogen atmosphere was maintained throughout the procedure. The contents of the flask were maintained at a temperature below 20° and a solution of 58 g. (1.0 mole) of propylene oxide in 100 ml. of carbon tetrachloride was added dropwise. After the addition was complete, the mixture was stirred at room temperature for one hour and filtered in nitrogen atmosphere. The filtrate was then freed of the solvent under reduced pressure. A black, heavy oil was collected. Its weight was about 90 g. (90 percent yield). This material was a mixture of chloropropoxy ferric chlorides corresponding to the generalized structure

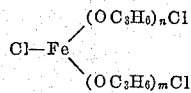

wherein $(m+n)=4$.

*Analysis.*—Calculated for $FeC_{12}H_{24}Cl_3O_4$: Fe, 14.1; Cl (total), 27.0; Cl (ionic), 9.0. Found: Fe, 15.0; Cl (total), 27.1; Cl (ionic), 8.4.

A solution of 29 g. (0.07 mole) of the above described chloropropoxy ferric chloride in a mixture of 100 ml. of carbon tetrachloride and 100 ml. of petroleum ether (B. P. 30–60°) was stirred in nitrogen atmosphere and a solution of 0.9 g. (0.05 mole) of water in 100 ml. of propylene oxide was added dropwise. After the addition was complete, the light brown precipitate was filtered under nitrogen, washed with 100 ml. of diethyl ether and dried at 50° under reduced pressure, weight 6 g.

*Analysis.*—C, 7.13; H, 2.70; Cl (total), 23.72; Fe, 42.25.

A mixture of 0.5 g. (2 percent by weight of the monomer) of the partially hydrolyzed compound and 25 g. of propylene oxide was sealed in a 70 ml. stainless steel bomb and agitated in a constant temperature bath, kept at 90°, for 40 hours. The entire quantity (100 percent) of the mixture was converted to a brown, rubbery, mass which was subsequently dissolved in 200 ml. of hot acetone and 2 ml. of conc. hydrochloric acid was added. The yellow solution was cooled to −20°, the precipitate was filtered and dried in vacuo. A tough, rubbery, polymer, weighing 10 g. (40 percent yield) resulted.

EXAMPLE 2

A solution of 29 g. (0.07 mole) of the dichloropropoxy ferric chloride (described in Example 1) in a mixture of 100 ml. of carbon tetrachloride and 100 ml. of petroleum ether (B. P. 30–60°) was treated in the same way as described in Example 1, excepting that the quantity of water used for the hydrolysis was 2.7 g. (0.15 mole). The resulting material weighed 18 g.

A mixture of 0.5 g. of the above compound and 25 g. of propylene oxide was polymerized in the same way as described in Example 1. Complete (100 percent) conversion of the monomer to a rubbery polymer resulted. This polymer was dissolved in 200 ml. of hot acetone and 2 ml. of concentrated hydrochloric acid was added. After the color of the solution changed to yellow, it was mixed with about two liters of cold water. The white polymer which precipitated was collected, washed with water to remove remaining solvent and dried in vacuo. A tough, rubbery material, weighing 21 g. (84 percent yield) resulted.

EXAMPLE 3

A number of stainless steel bombs having a capacity of about 70 ml. each were separately charged with the mixtures described for the various samples in the first table below and agitated in a constant temperature bath, which was maintained at 90° C., for 64 hours. The conversions and solid yields, which were determined by the method described in Example 2, are set forth in the second table below.

*Table I.—Charges of reactants*

Sample "A"—0.5 g. of chloropropoxy ferric chloride described in Example 1 with 25 g. of propylene oxide
Sample "B"—Same as in (A) plus 0.01 g. of water
Sample "C"—Same as in (A) plus 0.02 g. of water
Sample "D"—Same as in (A) plus 0.03 g. of water
Sample "E"—Same as in (A) plus 0.04 g. of water
Sample "F"—Same as in (A) plus 0.06 g. of water
Sample "G"—Same as in (A) plus 0.08 g. of water
Sample "H"—Same as in (A) plus 0.10 g. of water

*Table II.—Conversions and yields*

| Sample | Conversion, Percent | Solid Yield, Percent |
|---|---|---|
| "A" | 100 | 30 |
| "B" | 80 | 36 |
| "C" | 73 | 81 |
| "D" | 70 | 80 |
| "E" | 50 | 72 |
| "F" | 41 | 70 |
| "G" | 37 | 69 |
| "H" | 32 | 70 |

Similar excellent results may be obtained when propylene oxide is polymerized under the catalytic influence of other partially hydrolyzed reaction products of propylene oxide with ferric chloride or bromide, especially when the partially hydrolyzed catalyst is derived from a parent compound in which at least two moles of propylene oxide are reacted with the ferric halide. In a manner analogous to the foregoing, solid polymers of the other indicated varieties of olefin oxides, including various copolymeric products such as copolymers of about equal weight proportions of propylene oxide and chloropropylene oxides may be prepared in excellent results with other partially hydrolyzed catalytic ferric compounds that are adapted for utilization in the present process.

The present invention is to be interpreted and construed in the light of the hereto appended claims rather than strictly from the foregoing illustrative description and specification.

What is claimed is:

1. Process for polymerizing a lower vicinal olefin oxide that does not contain more than 4 carbon atoms in its molecule to form a solid polymeric material which comprises mixing the oxide with a minor proportion of a catalyst compound that consists of a partially hydrolyzed ferric compound that has been derived by incomplete hydrolysis of a parent ferric compound which is a reaction product of a ferric halide and propylene oxide corresponding to the empirical formula $FeX_3 \cdot (C_3H_6O)_n$, wherein X is a halogen of atomic number from 17 to 35 and $n$ has a value from 2 to 6; and heating the mixture to maintain it at a temperature between about 40° C. and 100° C. for a sufficient period of time to polymerize the oxide.

2. Process for polymerizing propylene oxide to form a solid polymeric material which comprises mixing the oxide with between about 1 and 6 percent by weight, based on the weight of the oxide, of a catalyst compound that consists of a partially hydrolyzed ferric compound that has been derived by incomplete hydrolysis of a parent ferric compound which is a reaction product of a ferric halide and propylene oxide corresponding to the empirical formula $FeX_3 \cdot (C_3H_6O)_n$, wherein X is a halogen of atomic number from 17 to 35 and $n$ has a value from 2 to 6; and heating the mixture to maintain it at a temperature between about 70° C. and 100° C. for a sufficient period of time to polymerize substantially all of the oxide to a polymeric material, and subsequently recovering solid propylene oxide from the reaction mass.

3. The process of claim 2, wherein X is chlorine.

4. The process of claim 2, wherein the partially hydrolyzed catalyst compound is derived from a parent reaction product that has at least 2 moles of propylene oxide reacted with each mole of the ferric halide.

5. The process of claim 2, wherein the partially hydrolyzed catalyst compound has a degree of hydrolysis that is from about 40 to 90 percent of complete hydrolysis.

6. In the process of claim 2, mixing the propylene oxide with an amount of about 2-4 percent by weight of the partially hydrolyzed catalyst compound, based on the weight of the oxide, and heating the mixture at a temperature of about 85-95° C. to polymerize the oxide.

7. A process in accordance with the process set forth in claim 2, wherein the mixture is heated for a period of time between about 40 and 180 hours.

8. Process for polymerizing propylene oxide with an amount up to about an equal proportion by weight of another olefin oxide selected from the group consisting of ethylene oxide, chloropropylene oxide, isobutylene oxide, 1,2-epoxy butane, the isomeric 2,3-epoxy butanes, styrene oxide, and mixtures thereof to form a solid copolymeric material, which process comprises mixing the monomeric oxides with between about 1 and 6 percent by weight, based on the weight of the oxides, of a catalyst compound that consists of a partially hydrolyzed ferric compound that has been derived by incomplete hydrolysis of a parent ferric compound which is a reaction product of a ferric halide and propylene oxide corresponding to the empirical formula $FeX_3 \cdot (C_3H_6O)_n$, wherein X is a halogen of atomic number from 17 to 35 and $n$ has a value from 2 to 6; and heating the mixture to maintain it at a temperature between about 70° C. and 100° C. for a sufficient period of time to polymerize substantially all of the oxides and subsequently recovering a solid propylene oxide copolymer in the reaction mass.

No references cited.